United States Patent [19]

Chinniah et al.

[11] Patent Number: 5,779,341
[45] Date of Patent: Jul. 14, 1998

[54] REDUCED PACKAGE DEPTH LOW-PROFILE LAMP WITH SMOOTHLY SHAPED LENSES

[75] Inventors: Jeyachandrabose Chinniah, Ann Arbor; Mahendra S. Dassanayake, Farmington Hills; Balvantrai G. Patel, Rochester Hills, all of Mich.

[73] Assignee: Ford Global Technologies, Inc., Dearborn, Mich.

[21] Appl. No.: 607,545

[22] Filed: Mar. 1, 1996

[51] Int. Cl.⁶ ........................................... B60Q 1/00
[52] U.S. Cl. .................. 362/61; 362/80; 362/308; 362/309; 362/336; 362/338
[58] Field of Search ................... 362/61, 80, 308, 362/309, 335, 336, 338

[56] References Cited

U.S. PATENT DOCUMENTS

| | | |
|---|---|---|
| 1,579,855 | 4/1926 | Beyer . |
| 1,601,688 | 9/1926 | Nystrom . |
| 1,788,926 | 1/1931 | Wood . |
| 2,082,100 | 6/1937 | Dorey et al. . |
| 4,577,260 | 3/1986 | Tysoe . |
| 4,684,919 | 8/1987 | Hihi . |
| 4,733,335 | 3/1988 | Serizawa et al. . |
| 5,174,649 | 12/1992 | Alston ................... 362/309 |

FOREIGN PATENT DOCUMENTS

| | | | |
|---|---|---|---|
| 479109 | 7/1929 | Germany | ............... 362/338 |
| 24 08 594 | 2/1975 | Germany . | |

*Primary Examiner*—Thomas M. Sember
*Attorney, Agent, or Firm*—Daniel M. Stock

[57] ABSTRACT

The lighting system for an automotive vehicle has uses smooth conic section solids to form a beam pattern. In one aspect of the invention the A/C ratio of the conic section solids are varied to collimate the light emitted in the vertical direction and spread light in the horizontal direction. In another aspect of the invention the A/C ratio of a hyperbolic conic section may remain the same while adding fluting to the outer surface of the lens to provide beam redirection.

19 Claims, 6 Drawing Sheets

REDUCED PACKAGE DEPTH LOW-PROFILE LAMP WITH SMOOTHLY SHAPED LENSES

RELATED APPLICATIONS

The present invention is related to commonly assigned concurrently filed applications 08/607,546 and 08/607,547 filed Mar. 1, 1996.

BACKGROUND OF THE INVENTION

The present invention relates to a forward lighting system for an automotive vehicle and, more specifically to an improved forward lighting system having a relatively small package height and depth.

Light distribution systems employing fiber optic cables for vehicle forward lighting are generally known in the art. The light distribution patterns of such forward lighting systems must ensure that adequate lighting is provided for the vehicle operator while minimizing visual interference with other drivers. Standards are set for cutoffs in front of the automobile above which light from a forward lighting system should not travel to avoid dazzling other drivers.

One such system uses round fiber optic bundles connected to a motor to move the fiber optic bundles in relation to a fixed lens to create the high beam and low beam patterns of the forward image. Such a design occupies considerable space at the front of the vehicle. Yet another disadvantage of that system is that it employs moving parts that may cause reliability problems in commercial high production applications.

Commonly assigned U.S. patent application Ser. No. 08/342,065 filed Nov. 18, 1994 now U.S. Pat. No. 5,550,716 describes a system in which a lens having a spherical inner surface and elliptical outer surface is used together with a diffusing lens to effectuate a regulation conforming beam pattern. A smaller package size and more stylish appearance are achieved when the diffusing lens is eliminated. Governmental lighting requirements cannot be met using if the diffusing lens is removed.

It would therefore be advantageous to provide a lighting system that has a relatively small package depth and package height while providing acceptable beam patterns without moving parts.

SUMMARY OF THE INVENTION

One advantage of the present invention is an aesthetically pleasing appearance may be formed while forming a regulation meeting light pattern. The size of the overall system is significantly reduced over conventional lighting systems.

The present invention includes a light source emitting light and a solid lens. The solid lens has a first surface and a second surface. The first surface has a conic section cross section through the optical axis of the lens wherein a first cross section of the first surface along a vertical plane intersecting the optical axis has a first A/C ratio substantially collimating light. The second cross section of the first surface along a horizontal plane intersecting the optical axis spreads light generated from the light source. The second conic section has a second A/C ratio so that said second conic section emits light within a predetermined angle from the optical axis. The first surface has a continuous smooth surface joining the first and second cross sections.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
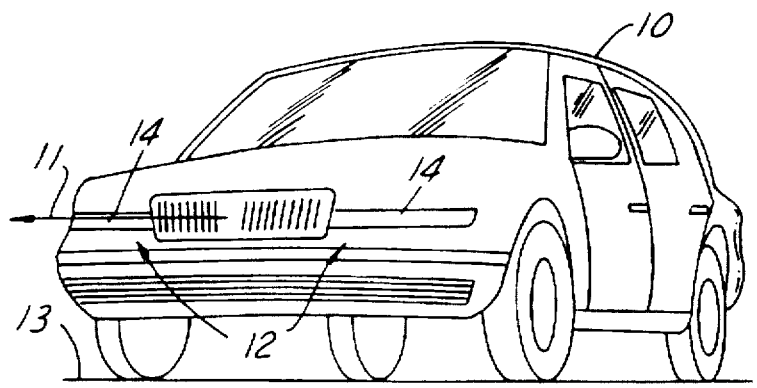
FIG. 1 is a perspective view of an automobile having a forward lighting system according to the present invention.

Referring now to FIG. 1, the front of an automotive vehicle 10 with a longitudinal axis 11 has a forward lighting system 12 used for both the high beam applications and low beam applications. Automotive vehicle 10 is placed upon a horizontal plane 13 representative of a road surface. Lighting system 12 has two lighting units 14 that may include but are not limited to a combination of forward lights including low beams, high beams, fog lamps, turn signal indicators and cornering lamps. Also, the system is equally suitable for rear automotive applications such as brake lamps, turns signal lamps and the like. Since regulatory requirements are most stringent for low beams, the description is primarily directed to low beams.

Figure 2:
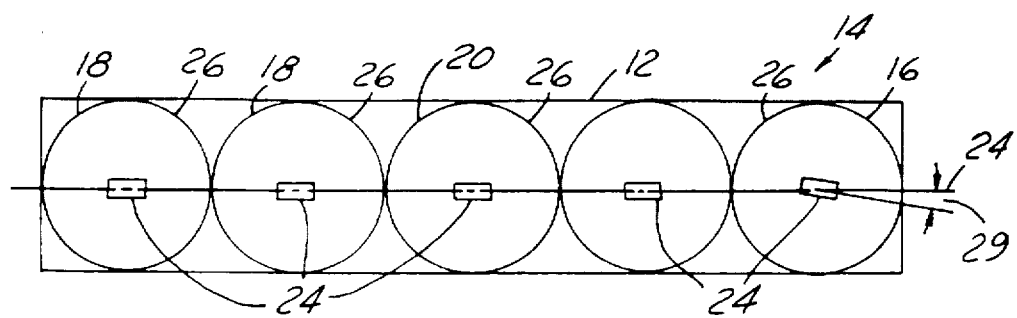
FIG. 2 is a front view of a light distributor according to the present invention.

Referring now to FIG. 2, forward lighting system 12 is described with reference to one lighting unit 14. Lighting unit 14 may be comprised of several individual segments that together provide the desired light output. In a preferred embodiment, lighting unit 14 includes a high intensity zone illuminator 16, two low beam segments 18 and two high beam segments 20. In providing a low beam light output of 500 lumens, the two low beam segments 18 each generate 200 lumens and high intensity zone illuminator generates 100 lumens. Lighting unit 14 may also include intermediate segments for a variable beam system. Each lighting unit, for example, may be designed to form a particular portion of a regulation-conforming beam pattern.

As shown, the segments are placed side by side. However, several configurations may be used depending on the design requirements of the individual application. The size of an individual lighting unit 14 is about 40 mm high. The length varies depending on the number of segments. The depth of the system is about 70 mm, which compares to 160 mm for prior art devices. The 40 mm height is very low compared to prior art forward lighting and allows automobile designers more flexibility in the front end design of an automotive vehicle.

An individual lighting unit 14 is comprised of a light emitter 24 in a fixed relation to a lens 26 Light emitter 24 is preferably planar and rectangular in shape to improve the desired cutoffs. Light emitter 24 for high intensity zone illumination in the preferred embodiment is 5 mm long and 2 mm wide. Facilitating compliance with cutoffs is the angle 29 between the axis of light emitter 24 and a horizontal axis 27. Angle 29 was found to give the most distinct cutoffs at about 12° from horizontal axis 27.

The size of light emitter 24 for the low beams and high beams is preferably 5 mm long and 4 mm wide. An output of 10 lumens per square millimeter may be achieved. Light emitter 24 is shown as a light pipe. Light emitter 24, however, can also be a number of different types of light sources including a bundle of fiber optic cables, an arc discharge lamp or incandescent filament. Low beam segments 18 and high beam segments 20 do not require inclination from the horizontal axis since light cutoffs are controlled by lens optics differently than the high intensity zone.

Lens optics for low beam segments use conic section solids to form the proper beam pattern. Described below are low beam lamps using ellipsoids and hyperboloids.

Figure 3:
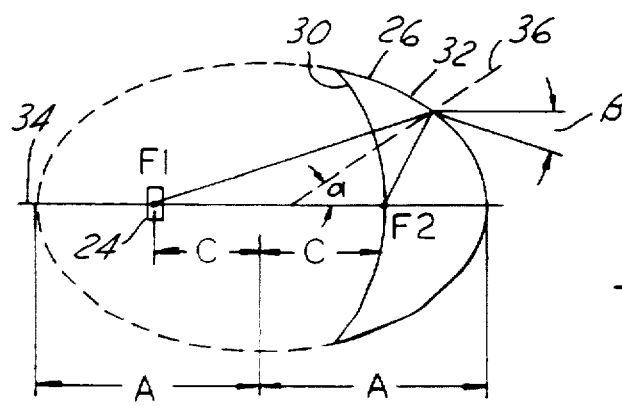
FIG. 3 is a diagrammatic view of the relationship of the light source and an ellipsoidal lens.

Referring now to FIG. 3, a vertical section along the optical axis 34 of the individual lighting unit is shown. Lens 26 has an inner surface 30 and an outer surface 32. Outer surface 32 is formed of an ellipsoid. Any section through optical axis 34 of an ellipsoid has an elliptical shape. Each ellipse preferably has a common first focal point F1 and a second focal point F2 located on an optical axis 34. Light emitter 24 is preferably located at point F1. Inner surface 30 is preferably spherical with a radius centered at F1 and a length equal to the distance between F1 and F2.

Low beam segment 18 has a spherical inner surface shape to increase light transference. When light emitter 24 is located at the center of inner surface 30 (i.e., F1), all the light incident on lens 26 is transferred into lens 26 since the light incident on the surface is perpendicular to a tangent (not shown) on inner surface 30. The greater the angle of light incident on the face is from a normal to the surface, the lesser the amount of light transferred into the surface. Therefore, the preferred shape of inner surface 30 is a sphere having a light source at its center.

The distance between the two focal points is (2C), i.e., the distance between a focal line and axis of symmetry 31, is (C). Half the length of the major axis of the ellipse is the length (A), i.e., the distance between the curve and axis of symmetry 31. Lens 26 is preferably made of glass or plastic having an index of refraction (n) of about 1.5. The light output deviation angle (β) from optical axis 34 is related to the shape of the lens by the formula:

$$\beta = \sin^{-1}\left[\frac{Cn}{A}\sin\alpha\right] - \alpha$$

where the angle α is the angle between a local normal 36 to the outer surface 32 of lens 26 and optical axis 34. It follows from the formula that if the ratio A/C is equal to the refractive index that the light will be collimated parallel to optical axis 34. Because of this geometry, smaller and brighter images are located closer to optical axis 34 whereas larger dimmer images are located further from optical axis 34. This is also critical in the design of forward lighting systems because a predetermined beam pattern is desired and having a brighter images located close to optical axis 34 facilitates beam control.

Figure 4:
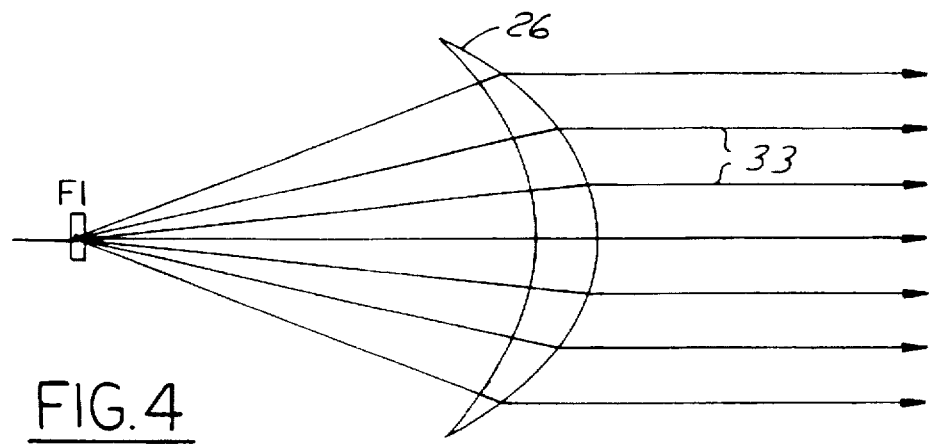
FIG. 4 is a cross sectional view of an ellipsoidal lens taken along a the vertical plane distributing collimated light.

Referring now to FIG. 4, a reproduction of a computer simulation of a vertical cross section of lens 26 having light rays 33 generated from light emitter 24 located at the focal point F1. Because the A/C ratio is approximately the refractive index of lens 26, the light is collimated. The collimated light is parallel to optical axis 34. If applications other than forward lighting are desired, divergence from optical axis 34 may be designed into lens 26. Light emitter 24 preferably has a Gaussian distribution over its length.

Figure 5:
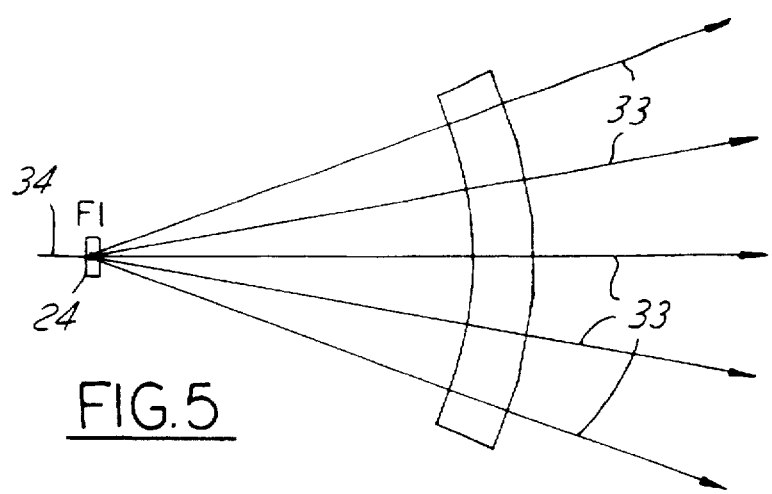
FIG. 5 is a cross sectional view of an ellipsoidal lens taken along a horizontal plane distributing light having a predetermined spread.

Referring now to FIG. 5, a reproduction of a computer simulation of a horizontal cross section of lens 26 is shown. The light rays 33 refracted by the lens diverge from optical axis 34 in the horizontal plane by an angle 35. Angle 35 is preferably about 25 degrees for headlamp applications. Since in a headlamp, beam spreading is a requirement, the A/C ratio of the horizontal ellipse is greater than the A/C ratio of the vertical ellipse. The amount of spreading can be increased if the A/C ratio is increased.

Figure 6:
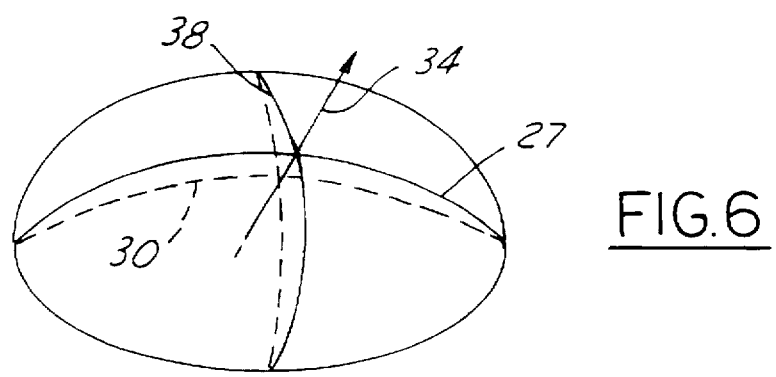
FIG. 6 is a perspective view of an outer surface of an ellipsoidal lens.

Referring now to FIG. 6, outer surface 32 of the ellipsoidal-shaped lens is shown with a horizontal axis 27 and vertical axis 38, i.e., where a vertical plane and a horizontal plane intersect optical axis 34. The figure emphasizes the difference in the A/C ratios of an ellipse of a horizontal section and an ellipse of a vertical section. As a vertical section through optical axis 34 is rotated through the horizontal plane, the A/C ratio of the ellipses forming outer surface 32 steadily increases. Optical axis 34 is shown as well as the intersection of the horizontal and vertical planes with inner surface 30.

Figure 7:
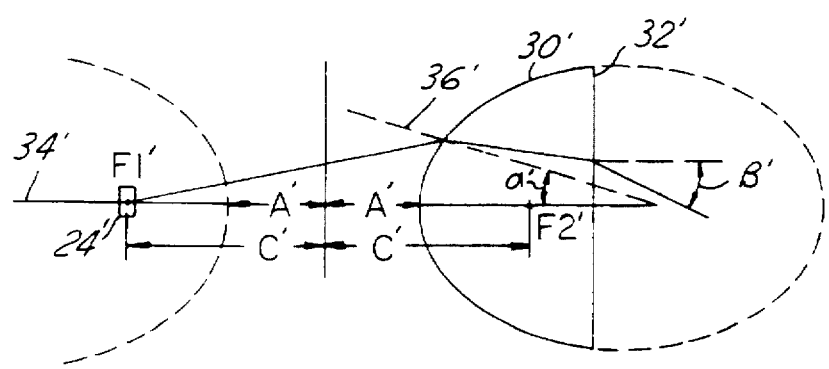
FIG. 7 is a diagrammatic view of the relationship of the light source and a hyperboloidal lens.

Referring now to FIG. 7, a vertical section along the optical axis 34' of a low beam segment 18 using a hyperboloid is shown. Common elements from FIG. 3 are shown using the same numbers but are primed. In this configuration, low beam segment 18 has an inner surface 30' and an outer surface 32'. Inner surface 30' is comprised of a hyperboloid having different A/C ratios in the horizontal and vertical directions. Outer surface 32' is comprised of a planar surface that is preferably perpendicular to optical axis 34' and to the horizontal plane not shown. Consequently, outer surface 32' has a limited effect on the light direction. Light emitter 34' is located at point F1'. Inner surface 30' provides most of the required beam shaping.

For a hyperbola, the difference of the distances from the foci to any point on the hyperbola is constant. The hyperbola generally has two portions, one around each of the foci. Only one of the curves is used for the lens.

The distance between the two focal points is (2C'), i.e., the distance between a focal point and axis of symmetry 31' is (C'). Half the length of the major axis of the hyperbola is the length (A'), i.e., the distance between the curve and axis of symmetry 31'. The light output deviation angle (β') from optical axis 34' is related to the shape of the lens by the formula:

$$\beta' = \sin^{-1}\left[ n\sin\left[ \sin^{-1}\left[ \frac{C}{nA} \sin\alpha' \right] - \alpha' \right] \right]$$

Where the angle (α') is the angle between a local normal 36' to the inner surface 30' and optical axis 34'. It follows from the formula that if the inverse of the ratio A/C is equal to the refracted index, the light would be collimated parallel to optical axis 34'. As in the elliptical case, this may be undesirable in a forward lighting system since its light downward angle is needed. Opposite the elliptical case, smaller and brighter images are located further from the optical axis 34' whereas larger dimmer images are located close to the optical axis 34'. To compensate for the difference, the light source instead of having a Gaussian distribution, as in the elliptical case, may have a double Gaussian distribution, i.e., where the center of the length of the light source does not emit as much light points half way between the center and end of the filament. A double Gaussian light source essentially has two hot spots.

Figure 8:
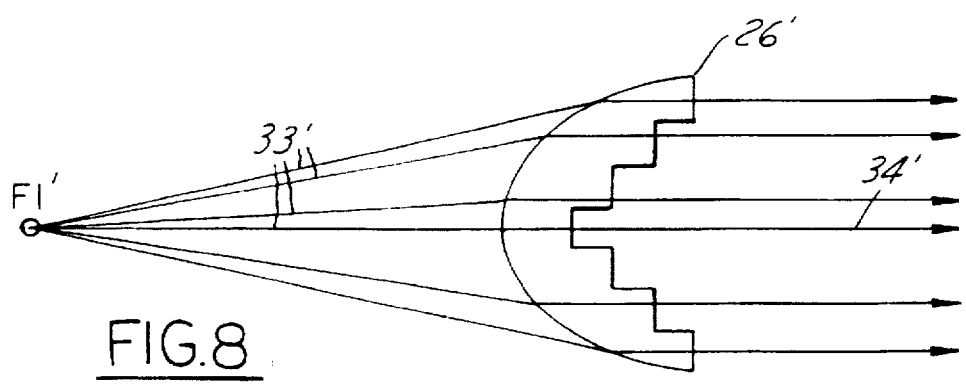
FIG. 8 is a cross sectional view of an hyperboloidal lens taken along a vertical plane distributing collimated light.

Referring now to FIG. 8, a reproduction of a computer simulation of a vertical cross section of lens 26' having light generated from a light source located at the focal point F1. Because the inverse of the A/C ratio is approximately the refractive index of lens 26', the light is collimated. The collimated light is parallel to optical axis 34'.

Figure 9:
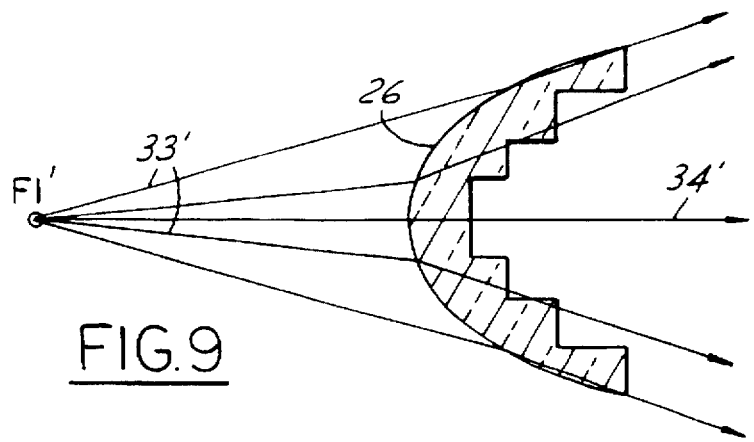
FIG. 9 is a cross sectional view of an hyperboloidal lens taken along a horizontal plane distributing light having a predetermined spread.

Referring now to FIG. 9, a reproduction of a computer simulation of a horizontal cross section of a hyperboloid lens 26 is shown. Light rays 33' refracted by the lens diverge from optical axis 34' in the horizontal plane. Since in a headlamp, beam spreading is a requirement, the inverse of the A/C ratio of the horizontal hyperbola is greater than the A/C ratio of the vertical hyperbola. The amount of spreading can be increased if the A/C ratio is increased.

Figure 10:
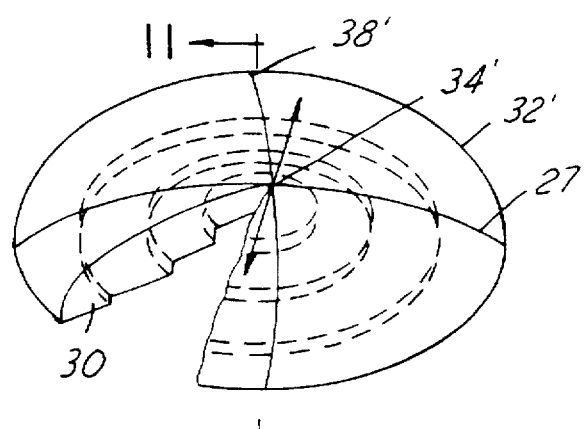
FIG. 10 is a perspective view of an inner surface of an hyperboloidal lens.

Referring now to FIG. 10, outer surface 32' of the hyperboloidal-shaped lens is shown with a horizontal axis 27' and vertical axis 38', i.e., where a vertical and horizontal planes intersect optical axis 34'. The figure shows the difference in the A/C ratios of the hyperbola of the horizontal section and the hyperbola of the vertical section. As a vertical section through optical axis 34 is rotated to the vertical plane, the A/C ratio of the hyperbolas forming outer surface 32 steadily increases. Optical axis 34 is shown as well as intersection of the horizontal and vertical planes with inner surface 30.

Figure 11:
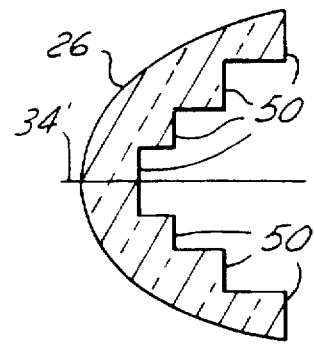
FIG. 11 is a cross sectional view of an hyperboloidal lens taken along a vertical plane.

Referring now to FIG. 11, a cross-sectional view of a hyperboloid lens is shown having planar rings 50. Planar rings 50 cause the thickness of the lens to be thinner and easier to manufacture. Rings 50 may be of any shape such a diamond-shaped or square. Rings 50 are preferably concentric about optical axis 34'. Rings 50 have substantially no effect on light rays if the plane of the rings are normal to optical axis 34.

Figure 12:
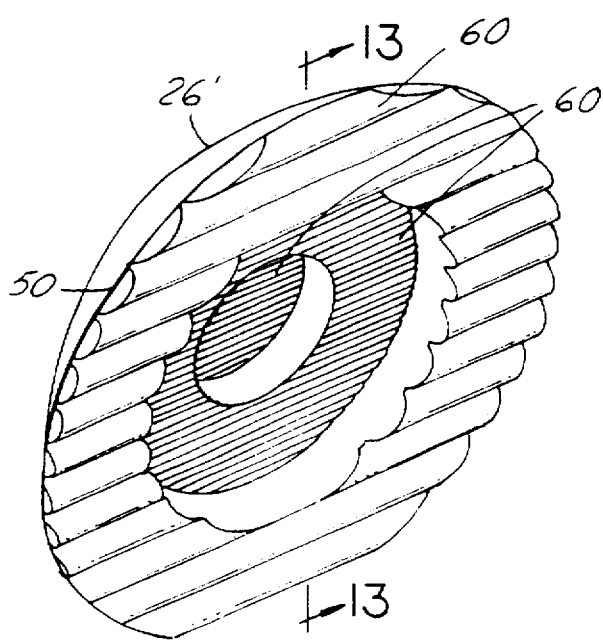
FIG. 12 is a perspective view of a hyperboloidal lens having fluting.

Referring now to FIG. 12, an alternative configuration to that of FIG. 10 where instead of increasing the A/C ratio from a vertical to a horizontal section, the A/C ratio of the cross-section remains constant. The means for shaping the beam in the horizontal may be achieved by adding fluting 60 to the planar rings 50. Fluting 60 may be molded integrally with the originally planar surface of lens 26. Fluting is preferably cylindrically shaped. Each flute has a predetermined radius to refract light in a particular direction.

Another means for refracting light may be holographic film such as is commercially available from Polaroid Corp.

Figure 13:
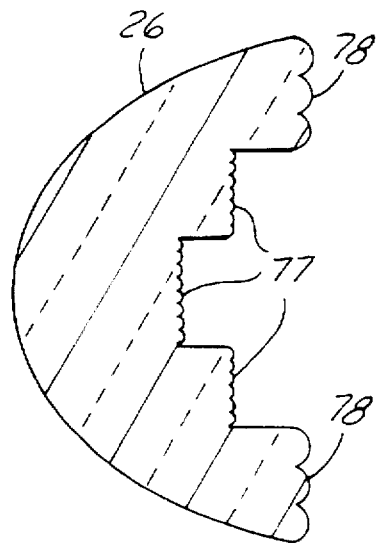
FIG. 13 is a cross sectional view of an hyperboloidal lens having fluting taken along a vertical plane.

Referring now to FIG. 13, a cross-sectional view of the hyperboloid lens of FIG. 12 is shown. Each flute may have a different orientations with respect to the horizontal axis and differently sized radii depending on the light distribution requirements of the particular application. As shown, center flutes 77 have smaller radii than that of outer flutes 78.

Figure 14:
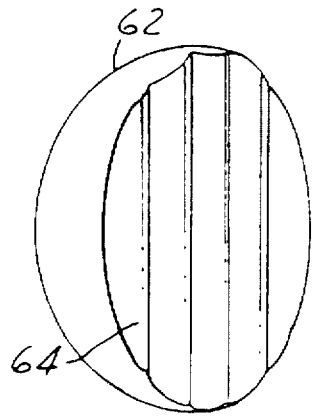
FIG. 14 is a hyperboloidal lens having a generally planar surface with vertical fluting.

Referring now to FIG. 14, a solid hyperboloid lens 62 is shown having vertical fluting 64. The fluting is preferably a portion of a cylinder.

Figure 15:
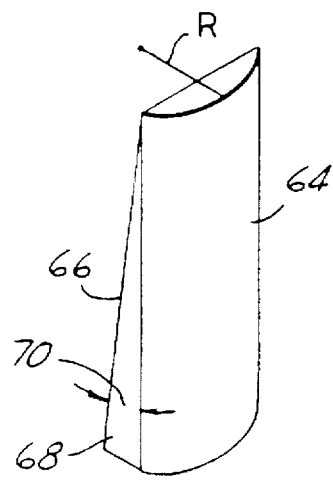
FIG. 15 is a perspective view of a single flute having a vertical wedge angle.

Referring now to FIG. 15, a vertical flute 64 is shown having a cylindrical cross section. The radius R for example may be between about 5 and 9 mm. Vertical flute 64 is offset from the otherwise horizontal lens surface 66 by a vertical wedge 68 having an angle 70. Vertical wedge 68 provides controlled redirection of the light either above or below the horizontal plane.

Figure 16:
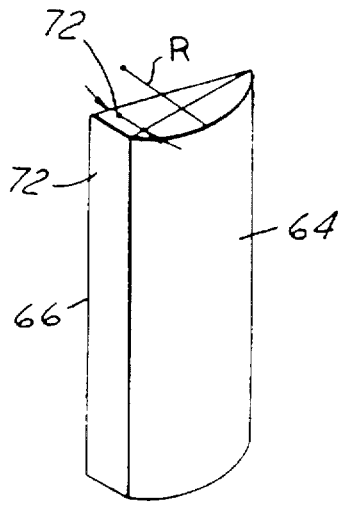
FIG. 16 is a perspective view of a single flute having a horizontal wedge angle.

Referring now to FIG. 16 a vertical flute 64 having a horizontal wedge 72 is shown. Horizontal wedge 72 offsets the flute 64 from the otherwise horizontal lens surface 66 by an angle 74. Horizontal wedge provides controlled redirection of light to the right of left of the vehicle.

Figure 17:
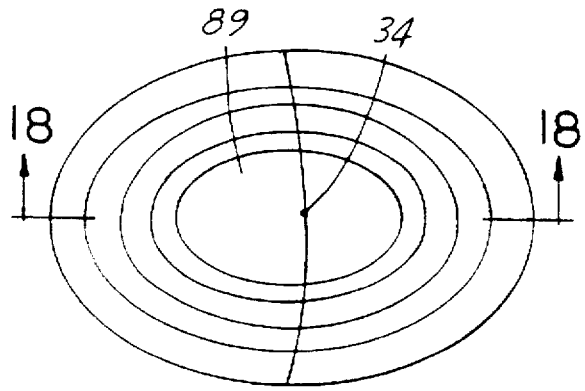
FIG. 17 is a perspective view of an inside surface of a hyperboloidal lens having a varying A/C ratio from the center to the edge of the lens.
Figure 18:
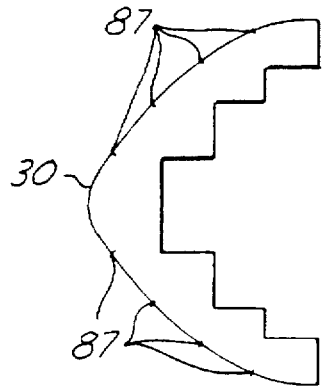
FIG. 18 is a cross sectional view of the lens of FIG. 14.

Referring now to FIGS. 17 and 18, a lens 26 is shown having a hyperbolic inner surface 30 having concentric bands of varying A/C ratios. The preferred method of implementation is to have inner band nearest optical axis 34 to have an A/C ratio to collimate light from the light source. The outer band 90 preferably spreads light a predetermined angle from optical axis 34. The A/C of the bands may also vary within the band. As in the previous examples, in the horizontal direction each band spreads light a predetermined amount from optical axis 34 while collimating light in the horizontal direction. Break points 87 show where transitions occur in horizontal section of FIG. 17.

Figure 19:
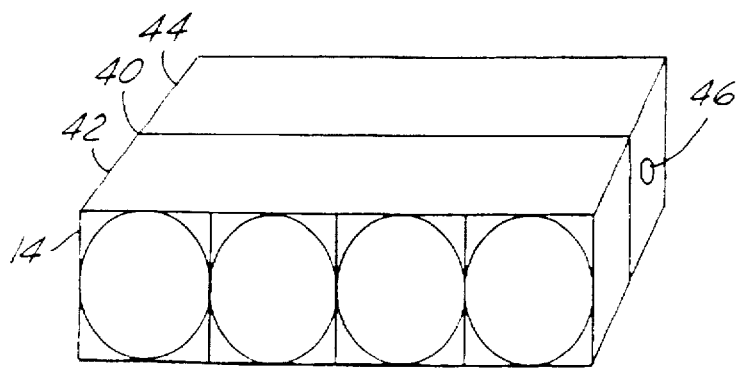
FIG. 19 is a perspective view of the lens in relation to a housing.

Referring now to FIG. 19, a housing 40 containing an individual lighting unit 14 is shown having two portions, a front housing 42 and a back housing 44. Front housing 42 secures lens 26 in a fixed relationship to the light distributor secured by housing 44 through locating hole 46.

Figure 20:
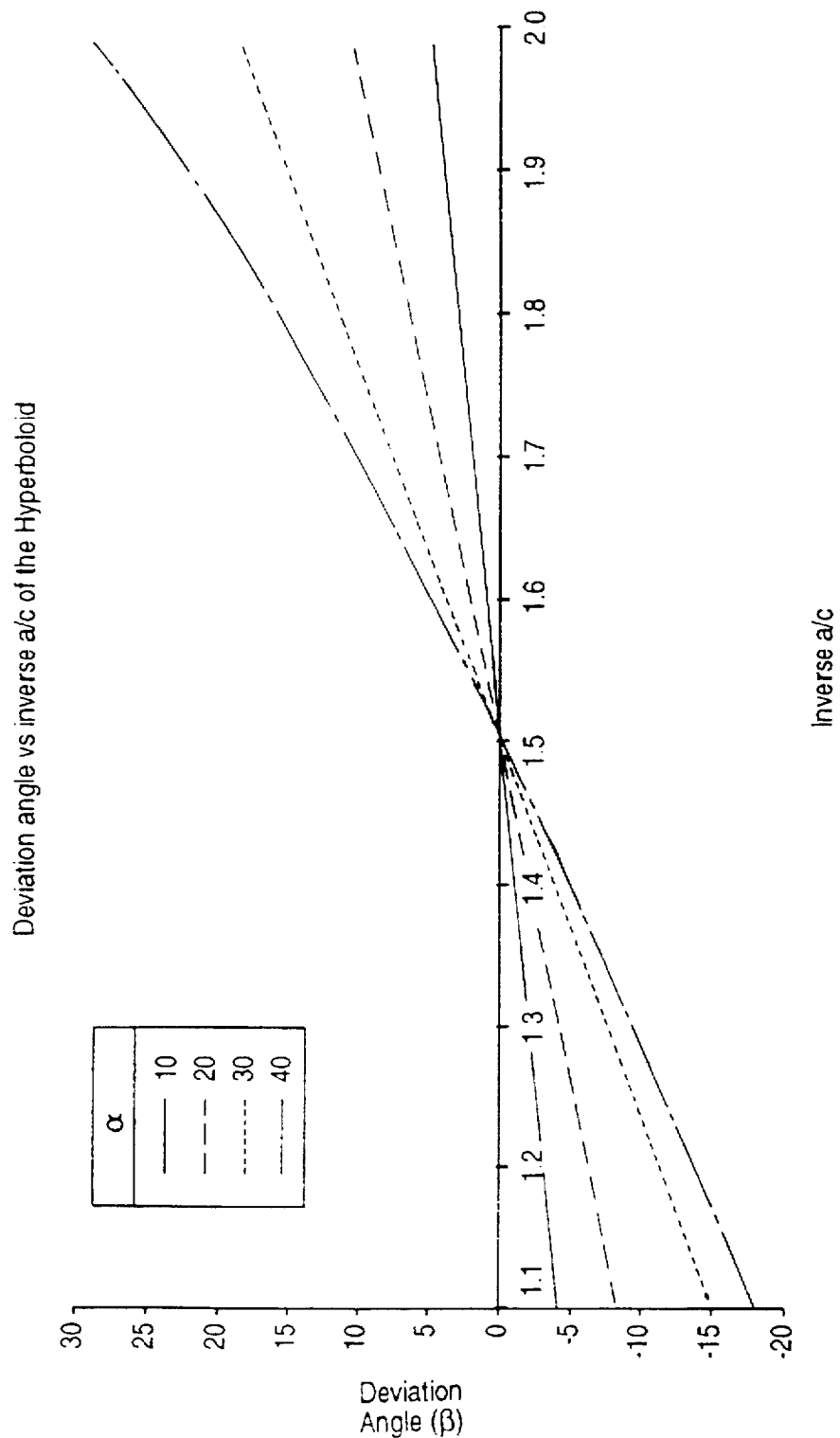
FIG. 20 is a plot of deviation angle versus the inverse A/C ratio of a hyperbola for different $\alpha$ values.

Referring now to FIG. 20 and FIG. 7, a plot of the deviation angle β' versus the inverse A/C ratio of a hyperboloid is shown for variations of a α'. From the graph it follows that as the inverse A/C ratio increases from the refractive index of the lens material, e.g., 1.5, the deviation angle increases. Different locations on the inner surface of lens 26' have increasing values of α' as the distance from the optical axis 34' increases. This corresponds to increasing beam spreading that can be controlled by controlling the inverse A/C ratio along the inner surface of lens 26'. When using an incandescent light source it is preferred to have positive deviation angles to prevent heat from building up in the lens.

Figure 21:
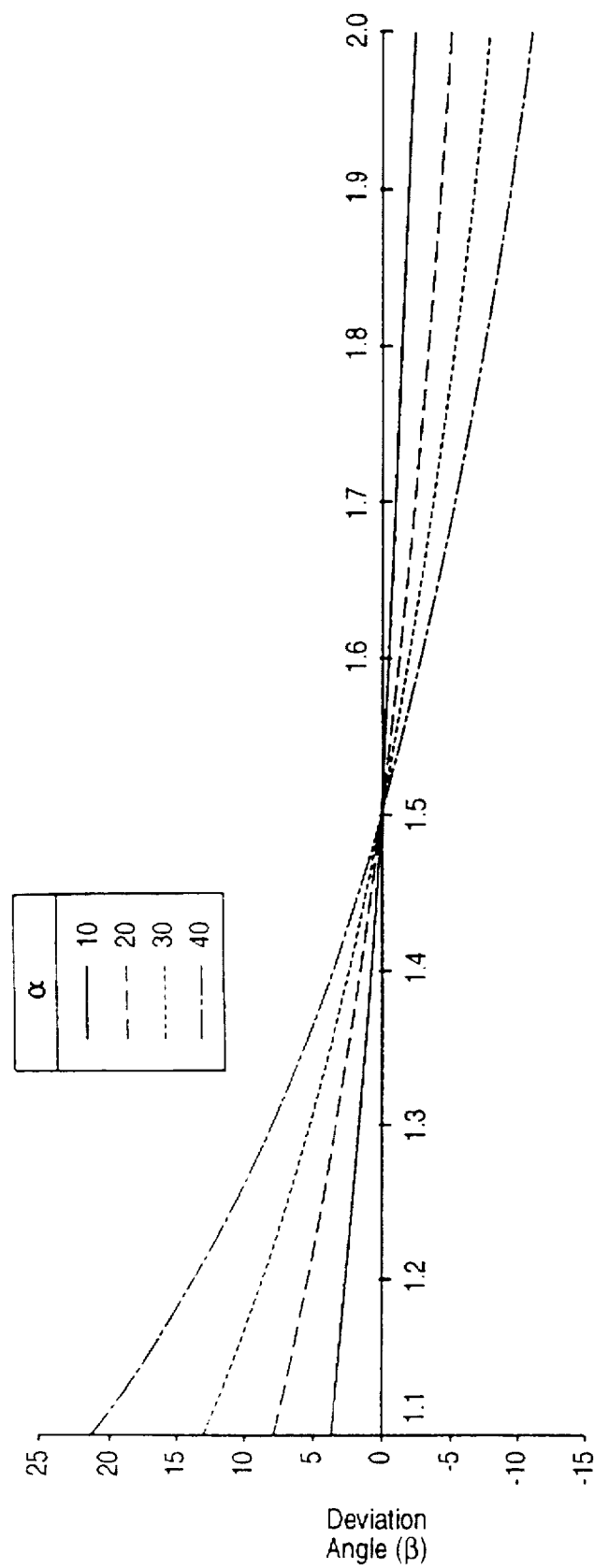
FIG. 21 is a plot of deviation angle versus the A/C ratio of an ellipse for different $\alpha$ values.

Referring now to FIG. 21 and FIG. 3, a plot of the deviation angle β versus the A/C ratio of an ellipsoid is shown for variations of α. From the graph it follows that as the A/C ratio decreases from the refractive index of the material, e.g., 1.5, the deviation angle increases. Different locations on the outer surface of lens 26 have increasing values of α as the distance from the optical axis 34 increases. This corresponds to increasing beam spreading that can be controlled by controlling the A/C ratio along the outer surface of lens 26.

Various modifications will be apparent to those skilled in the art. For example, variations of the applications with their associated variations in light output may be easily employed using the teachings provided herein. All such modifications would be within the scope of this invention.

What is claimed is:

1. A lighting system for an automotive vehicle having an optical axis, a longitudinal axis, a horizontal plane and a vertical plane perpendicular to said horizontal plane and parallel to the longitudinal axis of said vehicle, said lighting system comprising:

a light source emitting light; and a solid lens having a first surface and a second surface, wherein said first surface has a hyperbolic cross section through said optical axis having a substantially constant A/C ratio, wherein A is half a length of a major axis and C is a distance between a focal line and an axis of symmetry, and said second surface having a planar surface, wherein said planar surface is substantially perpendicular to said horizontal and vertical planes.

2. A lighting system for an automotive vehicle as recited in claim 1 wherein said planar surface is comprised of a plurality of stepped planer surfaces.

3. A lighting system for an automotive vehicle as recited in claim 2 wherein said outer surface comprises a plurality of concentric planar rings.

4. A lighting system for an automotive vehicle as recited in claim 3 wherein said rings are circular.

5. A lighting system for an automotive vehicle as recited in claim 3 wherein said rings are rectangular.

6. A lighting system for an automotive vehicle as recited in claim 3 wherein said planar ring have fluting integrally formed on said planar ring to redirect light emitted by said light source in a predetermined direction.

7. A lighting system for an automotive vehicle as recited in claim 3 wherein said planar ring have holographic film on said planar ring to redirect light emitted by said light source in a predetermined direction.

8. A lighting system for an automotive vehicle having an optical axis, a longitudinal axis, a horizontal plane and a vertical plane perpendicular to said horizontal plane and parallel to the longitudinal axis of said vehicle, said lighting system comprising:

a light source emitting light; and a solid lens having a first surface and a second surface, said first surface having a conic section cross section through said optical axis wherein a first cross section of said first surface along a vertical plane intersecting said optical axis has a first A/C ratio, wherein A is half a length of a major axis and C is a distance between a focal line and an axis of symmetry, substantially collimating light and wherein a second cross section of said first surface along a horizontal plane intersecting said optical axis spreading light generated from said light source, said second conic section having a second A/C ratio so that said second conic section emitting light within a predetermined angle from said optical axis, said first surface having a continuous smooth surface joining said first and second cross sections.

9. A lighting system for an automotive vehicle as recited in claim 8 wherein said first conic section and said second conic section have substantially coincident first and second focal points.

10. A lighting system for an automotive vehicle as recited in claim 8 wherein said first surface is said inner surface and wherein said first and second conic section is a hyperbola.

11. A lighting system for an automotive vehicle as recited in claim 8 wherein said second surface comprises a planar surface.

12. A lighting system for an automotive vehicle as recited in claim 8 wherein said planar surface is substantially parallel to said horizontal and vertical planes.

13. A lighting system for an automotive vehicle as recited in claim 12 wherein said planar surface comprises a plurality of concentric planar rings.

14. A lighting system for an automotive vehicle as recited in claim 8 wherein said first surface is an outer surface, said first and second conic sections are ellipses.

15. A lighting system for an automotive vehicle as recited in claim 14 wherein said second surface is an inner surface comprising a spheroid having a center coincident with a focal point of said ellipse.

16. A lighting system for an automotive vehicle as recited in claim 8 wherein each of said first and second conic sections have substantially equivalent A/C ratios.

17. A lighting system for an automotive vehicle as recited in claim 8 wherein each of said first and second conic sections have common first and second focal points.

18. A lighting system for an automotive vehicle having an optical axis, a longitudinal axis, a horizontal plane and a vertical plane perpendicular to said horizontal plane and parallel to the longitudinal axis of said vehicle, said lighting system comprising:

a light source emitting light; and a solid lens having a first surface and a second surface, said first surface comprised of a plurality of smoothly connected concentric conic sections, wherein a cross section of said first surface through said optical axis has a first A/C ratio, wherein A is half a length of a major axis and C is a distance between a focal line and an axis of symmetry, at said optical axis and, as the distance from said optical axis increases, having increasing A/C ratios that emit light within increasing predetermined angles from said optical axis.

19. A lighting system for an automotive vehicle as recited in claim 18 wherein said first A/C ratio to substantially collimating light and said second A/C ration collimating light spreading light generated from said light source.

* * * * *